(12) United States Patent
Demas et al.

(10) Patent No.: US 8,238,725 B2
(45) Date of Patent: Aug. 7, 2012

(54) SYSTEM AND METHOD FOR PROVIDING PERSONAL VIDEO RECORDING TRICK MODES

(75) Inventors: Jason Demas, Irvine, CA (US); Marcus Kellerman, Aliso Viejo, CA (US); Sandeep Bhatia, Karnataka (IN); Srinivasa Mogathala Prabhakara Reddy, Karnataka (IN); Sherman Chen, San Diego, CA (US); Vijayananand Aralaguppe, Karnataka (IN); Girish Raghunath Hulamani, Karnataka (IN); Pramod Chandraiah, Karnataka (IN); Ghanashayam Bailwal, Karnataka (IN)

(73) Assignee: Broadcom Corporation, Irvine, CA (US)

( * ) Notice: Subject to any disclaimer, the term of this patent is extended or adjusted under 35 U.S.C. 154(b) by 1120 days.

(21) Appl. No.: 10/174,384

(22) Filed: Jun. 18, 2002

(65) Prior Publication Data
US 2003/0165322 A1 Sep. 4, 2003

Related U.S. Application Data

(63) Continuation-in-part of application No. 10/060,118, filed on Jan. 29, 2002, which is a continuation-in-part of application No. 09/933,231, filed on Aug. 20, 2001, which is a continuation-in-part of application No. 09/951,693, filed on Sep. 11, 2001.

(60) Provisional application No. 60/361,154, filed on Mar. 1, 2002.

(51) Int. Cl.
*H04N 5/928* (2006.01)
*H04N 5/78* (2006.01)
*H04N 5/84* (2006.01)
*H04N 5/92* (2006.01)
*H04N 5/93* (2006.01)
*H04N 5/783* (2006.01)
*H04N 7/00* (2011.01)
*H04N 7/12* (2006.01)
*H04N 7/16* (2011.01)
*H04N 7/26* (2006.01)
*H04N 7/167* (2011.01)
*H04N 7/173* (2011.01)
*H04N 11/02* (2006.01)
*H04J 3/22* (2006.01)
*H04L 12/56* (2006.01)
*G06F 15/16* (2006.01)

(52) U.S. Cl. ........ 386/338; 386/246; 386/280; 386/285; 386/288; 386/324; 386/328; 386/334; 386/337; 386/339; 386/343; 348/423.1; 348/474; 348/558; 348/700; 370/394; 370/473; 380/201; 380/210; 380/239; 709/219; 725/38; 725/46; 725/58; 725/61; 725/87; 725/90; 725/91; 725/92; 725/105; 725/112; 725/113; 725/115; 725/133; 725/134; 725/135; 725/141; 725/142; 725/153

(58) Field of Classification Search ............. 386/96, 386/56, 52, 68, 82, 81, 95, 98, 111, 33, 75, 386/104, 105, 109, 112, 125, E5.052, E5.013, 386/E5.025, E5.033, E9.013, 246, 343, 326, 386/329, 351, 356; 348/700, 423.1, 474, 348/558, E5.006, E5.008, E7.073, E5.007; 725/38, 134, 142, 36, 42, 46, 87, 61, 58, 725/133, 141, 153, 92, 91, 90, 115, 105, 725/112, 113, 135; 375/240.12, E7.267, 375/E7.271, E7.279, E7.025, E7.014, E7.022, 375/E7.004, E7.023, E7.148, E7.18, E7.198, 375/E7.211, E7.224; 380/201, 210, 239; 709/219, 245; 370/394, 473, 474; 705/51; 707/E17.028; 360/48
See application file for complete search history.

(56) References Cited

U.S. PATENT DOCUMENTS

| | | | | |
|---|---|---|---|---|
| 5,732,067 A * | 3/1998 | Aotake | ............. | 369/275.3 |
| 5,740,307 A * | 4/1998 | Lane | ............. | 386/68 |
| 5,923,812 A * | 7/1999 | Sakazaki et al. | ............. | 386/326 |
| 6,002,834 A * | 12/1999 | Hirabayashi et al. | ............. | 386/70 |
| 6,292,621 B1 * | 9/2001 | Tanaka et al. | ............. | 386/56 |
| 6,314,234 B1 * | 11/2001 | Kawamura et al. | ............. | 386/95 |
| 6,363,212 B1 * | 3/2002 | Fujinami et al. | ............. | 386/104 |
| 6,369,855 B1 * | 4/2002 | Chauvel et al. | ............. | 348/423.1 |
| 6,385,771 B1 * | 5/2002 | Gordon | ............. | 386/68 |
| 6,490,406 B1 * | 12/2002 | Van Gestel et al. | ............. | 386/343 |

| | | | |
|---|---|---|---|
| 6,504,994 B2 * | 1/2003 | Kawamura et al. | 386/95 |
| 6,608,966 B1 * | 8/2003 | Anderson et al. | 386/68 |
| 6,658,199 B1 * | 12/2003 | Hallberg | 386/346 |
| 6,681,397 B1 * | 1/2004 | Tsai et al. | 725/92 |
| 6,728,312 B1 * | 4/2004 | Whitford et al. | 375/240.01 |
| 6,731,859 B1 * | 5/2004 | Honjo | 386/344 |
| 6,853,728 B1 * | 2/2005 | Kahn et al. | 380/239 |
| 6,901,603 B2 * | 5/2005 | Zeidler et al. | 725/39 |
| 7,177,522 B2 * | 2/2007 | MacInnis | 386/68 |
| 7,356,245 B2 * | 4/2008 | Belknap et al. | 386/75 |
| 7,376,330 B2 * | 5/2008 | Oura et al. | 386/33 |
| 2001/0026677 A1 * | 10/2001 | Chen et al. | 386/68 |
| 2002/0061183 A1 * | 5/2002 | MacInnis | 386/68 |
| 2002/0165983 A1 * | 11/2002 | Gastaldi | 709/245 |
| 2002/0174433 A1 * | 11/2002 | Baumgartner et al. | 725/58 |
| 2002/0186768 A1 * | 12/2002 | Dimitrova et al. | 375/240.12 |
| 2003/0043847 A1 * | 3/2003 | Haddad | 370/473 |
| 2003/0093790 A1 * | 5/2003 | Logan et al. | 725/38 |
| 2003/0123849 A1 * | 7/2003 | Nallur et al. | 386/68 |
| 2003/0169815 A1 * | 9/2003 | Aggarwal et al. | 375/240.12 |
| 2003/0182579 A1 * | 9/2003 | Leporini et al. | 713/201 |
| 2005/0204385 A1 * | 9/2005 | Sull et al. | 725/45 |
| 2006/0218611 A1 * | 9/2006 | Son et al. | 725/105 |

FOREIGN PATENT DOCUMENTS

JP    361094167 A  *  5/1986

* cited by examiner

*Primary Examiner* — Thai Tran
*Assistant Examiner* — Syed Y Hasan
(74) *Attorney, Agent, or Firm* — Thomas, Kayden, Horstemeyer & Risley LLP.

(57) ABSTRACT

Systems and methods that provide personal video recording trick modes are provided. In one example, a method that provides a trick mode in a personal video recording system may include the steps of receiving a transport stream; storing data from the transport stream in a data storage; generating index table using the data from the transport stream; receiving a trick mode command; and accessing, based on the trick mode command, particular data in the data storage using the index table.

20 Claims, 6 Drawing Sheets

SYSTEM AND METHOD FOR PROVIDING PERSONAL VIDEO RECORDING TRICK MODES

RELATED APPLICATIONS

This application makes reference to, claims priority to and claims benefit from U.S. Provisional Patent Application Ser. No. 60/361,154 entitled "Time-Base Management for MPEG Decoding with Personal Video Recording (PVR) Functionality" filed on Mar. 1, 2002. This application is a continuation-in-part of U.S. patent application Ser. No. 09/933,231 entitled "Apparatus and Method of Seamless Switching between a Live DTV Decoding and a PVR Playback" filed on Aug. 20, 2001. This application is also a continuation-in-part of U.S. patent application Ser. No. 10/060,118 entitled "Error Concealment for MPEG Decoding with Personal Video Recording Functionality" filed on Jan. 29, 2002. This application is further a continuation-in-part of U.S. patent application Ser. No. 09/951,693 entitled "Command Packets for Personal Video Recorder" filed on Sep. 11, 2001.

INCORPORATION BY REFERENCE

The above-referenced United States applications are hereby incorporated herein by reference in their entirety.

BACKGROUND OF THE INVENTION

A Personal Video Recorder (PVR) system offers consumers a hard disk or a network-based VCR that digitally records live television (TV) programs while offering the versatility of select playback and associated special features. Live sources for a PVR system include a live digital broadcast and a live analog broadcast.

It is desirable that the PVR system offer consumers a variety of trick modes that can exploit the use of the live and/or recorded programming. For example, it is desirable that the PVR system provide trick modes to consumers such as, for example, pause/still, fast forward, slow forward, rewind, slow reverse, skip, etc.

Further limitations and disadvantages of conventional and traditional approaches will become apparent to one of ordinary skill in the art, through comparison of such systems with the present invention as set forth in the remainder of the present application with reference to the drawings.

BRIEF SUMMARY OF THE INVENTION

Aspects of the present invention may be found in systems and methods that provide personal video recording trick modes. In one embodiment, the present invention may provide a method for providing a trick mode in a personal video recording system. The method may include the steps of receiving a transport stream; storing data from the transport stream in a data storage; generating index table using the data from the transport stream; receiving a trick mode command; and accessing, based on the trick mode command, particular data in the data storage using the index table.

In another embodiment, the present invention may provide a method for providing a trick mode in a personal video recording system. The method may include the steps of retrieving a first frame from a data storage; decoding the first frame; retrieving a second frame from the data storage; and decoding the second frame using the first frame.

In yet another embodiment, the present invention may provide a method for entering a trick mode in a personal video recording system. The method may include the steps of halting data feed into video decoder; reading a time stamp from last displayed picture; flushing video buffer; and selecting particular pictures for display using an index table.

In yet still another embodiment, the present invention may provide a method for providing a trick mode in a personal recording system. The method may include the steps of receiving a trick mode command; determining a requested speed from the trick mode command; if the requested speed is less than real time speed, then configuring a video decoder to decode one frame for each X vertical synchronization pulses, where X is a positive number greater than one; and if the requested speed is not less than real time speed, then configuring the video decoder to decode Y frames for each vertical synchronization pulse, where Y is a positive number greater than one.

These and other advantages and novel features of the present invention, as well as details of illustrated embodiments thereof, will be more fully understood from the following description and drawings.

DETAILED DESCRIPTION OF THE INVENTION

Figure 1:
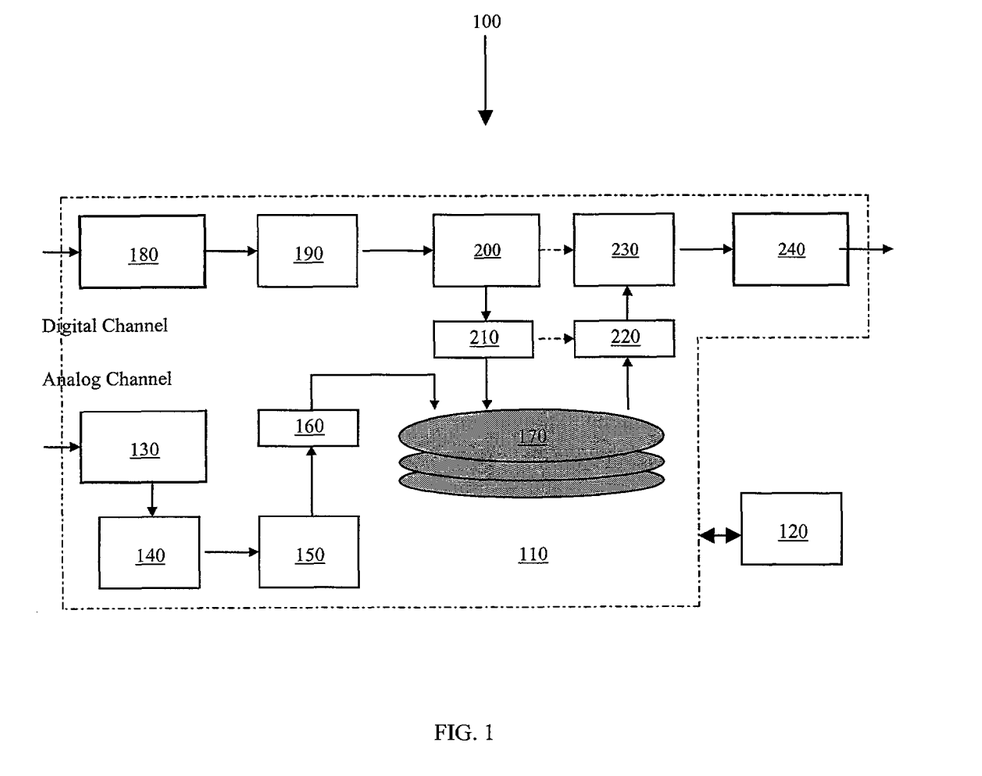
FIG. 1 shows an example of a personal video recorder (PVR) system according to the present invention.

FIG. 1 shows an example of a personal video recorder (PVR) system according to the present invention. The personal video recorder (PVR) system 100 may include, for example, a PVR module 110 coupled to a host processor 120. The PVR module 110 may include, for example, an analog demodulator 130, a video decoder (VDEC) 140, a moving pictures experts group (MPEG) encoder 150, a first-in-first-out (FIFO) buffer 160, a hard drive 170, a digital demodulator 180, a forward error correction (FEC) decoder 190, an MPEG data transport processor 200, a FIFO buffer 210, a FIFO buffer 220, an MPEG video decoder 230 and a display processor 240. The couplings and interactions between the various PVR system components and the operation of the PVR system are disclosed in the above-referenced incorporated applications and will not be described in detail herein. The scope of the present invention is not limited by the illustrated example. For example, the present invention is not limited to a hard drive, but may employ in addition to or instead of a hard drive any of the following examples: an optical storage device, a magnetic storage device, an electrical storage device, a network or combinations thereof. In addition, the present invention is not limited to the illustrated embodiment, but may also include, for example, other embodiments, parts or aspects thereof also disclosed in the incorporated applications. Thus, for example, the PVR system 100 may also include an audio buffer, an audio decoder and an audio output device which may or may not be integrated, at least in part, with corresponding video components. Furthermore, although the present invention may find applications as part of or in conjunction with a set top box, the present invention need not be so limited. The present invention may find application, for example, in the front end portion or the head end portion of a system or network. Thus, for example, the present invention may be employed in the head end portion of a video-on-demand server.

When a stream is being played back from a storage element, it can be played back with a variety of modifications, for example, to a configuration of a decoder or with various manipulations to the stream that may result in a trick mode appearance of the video or audio. Examples of trick mode features include fast forward or rewind of a stream that is being played from a storage element (e.g., a hard disk or a file server).

A host trick mode may be achieved, for example, if a stream can be manipulated after recording, but before playback by the host, and a decoder may be configured to decode the result as if it had not been altered at all. Some basic configuration elements (e.g., disabling continuity counter checking) may be configured to allow for decoding the resulting stream. In one example, only I-frames may be sent to a decoder while P-frames and B-frames may be dropped before playback. The host and, in particular, a host processor may provide a command packet into the playback stream that may be used to configure a decoder as a function of stream content to allow for more complex results from the stream manipulation.

A decoder trick mode may be achieved, for example, by configuring a decoder to decode differently than it normally would for a particular stream. For example, the decoder may be configured to display each decoded picture twice instead of just once, thereby resulting in a slow motion display at approximately half (½-times) the speed. The effect may also be achieved, for example, by employing a system time clock (STC) trick mode. An STC trick mode may manipulate the STC in a non-linear manner.

Although trick mode embodiments may be described in an orthogonal manner, they may coexist to support even more complex system level visual effects. For example, a 3-times host trick mode may be used in combination with a 2-times decoder trick mode that may result in a 6-times fast forward. Such a combination of trick modes may be smoother than a 6-times host trick mode fast forward, but without the computational overhead of a 6-times decoder trick mode.

In a host trick mode, a recorded stream may be manipulated by the host to create a visual effect of a trick mode. For example, pictures may be dropped cleanly in the stream to cause the visual effect of a fast forward. The basic data flow for host-based trick modes may be similar to a standard playback with a few differences, some of which are described below.

A difference between the data flow in a host-based trick mode and a standard playback may relate to timebase management. Since there may be no audio with which to synchronize, the video decompression engine may be configured to run without enabling timebase management. Thus, for example, a picture may be decoded as soon as it is received and may be displayed on the next available vertical sync. An advantage may be that the step of initializing a time stamp (e.g., presentation time stamp (PTS) or a decode time stamp (DTS)) or the STC may be avoided, for example, by the host.

Another difference may relate to continuity counter errors. Nominally, the data transport engine and the video decompression engine monitor the continuity counters in the transport stream to detect errors. However, since entire pictures may be dropped during some host trick modes, continuity counters may no longer be valid. Thus, the step of continuity count checking may be disabled during the playback in some host trick modes.

Another difference may relate to buffer management. When entering or exiting a host trick mode, it may be visually appealing to flush the video buffer so that the decoder may respond instantly to requests by the user. Special transport packets containing configuration information may be inserted into the manipulated stream by the host to configure the decoder in various dimensions during a host trick mode. These command packets may not be required for normal trick modes of nominal content, but may allow for more advanced processing with some styles of content.

Figure 5:
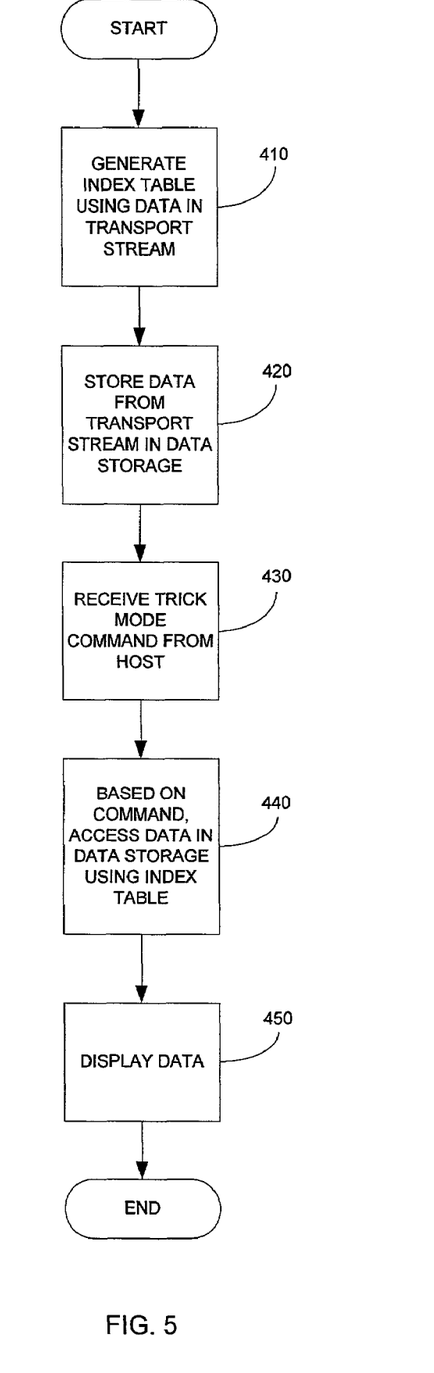
FIG. 5 is a flowchart illustrating an example of a process that provides a host trick mode according to the present invention.

FIG. 5 is a flowchart illustrating an example of a process that provides a host trick mode according to the present invention. In step 410, a transport stream is received and an index table is generated using data determined from the transport stream. The index table may provide information concerning, for example, the location of information from the transport stream that has been stored in data storage. In one example, the index table is created in real time during the recording of the transport stream in the data storage. In step 420, data from the transport stream is stored in the data storage. The index table may also be stored in the data storage. In one example, the transport stream and the index table are both stored in a memory (e.g., a unified synchronous dynamic random access memory (SDRAM) memory). The memory may include any of the following memory types: dynamic random access memory (DRAM), SDRAM, double data rate synchronous dynamic random access memory (DDR-SDRAM), extended data output dynamic random access memory (EDO-DRAM), rambus dynamic random access memory (RDRAM), etc. Information may be transferred between the memory and a storage element such as, for example, a file server or a hard disk via direct memory access (DMA) circuitry. In step 430, a trick mode command is received from the host. Subsequently, in step 440, based on the received command, data is accessed in the data storage using the index table. For example, the host may receive a command to retrieve only I-frames and only every other I-frame. Using the index table to locate every other I-frame, the host may facilitate passing every other I-frame from data storage to, for example, the video decoder while skipping or dropping other frames. In step 450, the video decoder may decode and display, for example, the received I-frames.

Figure 6:
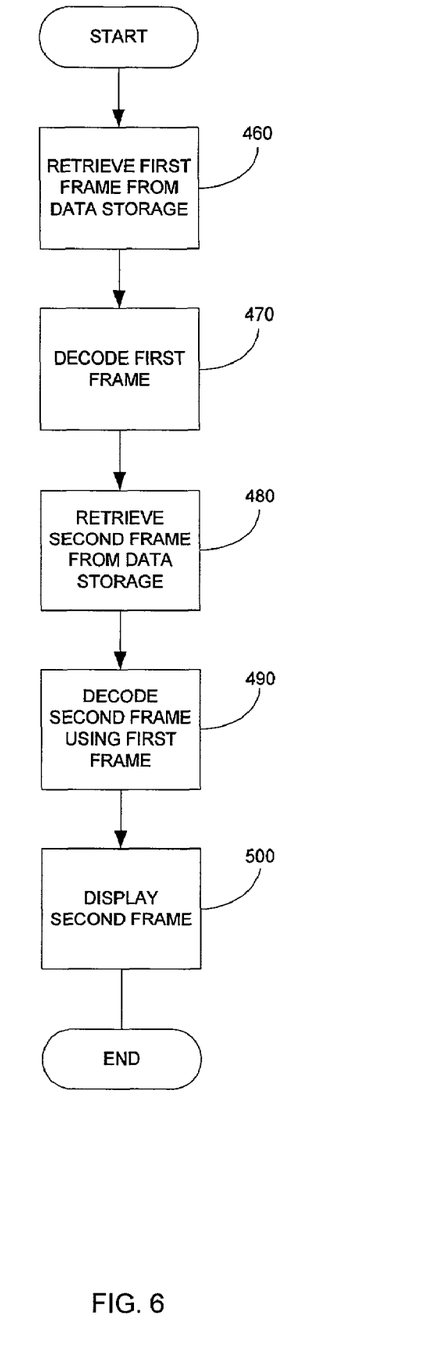
FIG. 6 is a flowchart illustrating an example of a process that provides a host trick mode according to the present invention.

FIG. 6 is a flowchart illustrating an example of a process that provides a host trick mode according to the present invention. Although applicable to digital broadcast environments, transport streams may also include, for example, program streams, packetized elementary streams or other elementary streams and the processes described herein may also be applicable to other environments (e.g., digital video disc or digital versatile disc (DVD), personal computer (PC), etc.) In some examples, the use of continuity counters may become less important in some environments than in other environments. In one example, transport streams may include different types of frames (e.g., I-frames, P-frames or B-frames). Thus, for example, I-frames may contain the most information. P-frames may be disposed between the I-frames and may be a function of the information contained in the I-frames. B-frames may be disposed between the I-frames and/or the P-frames and may be a function of the I-frames and/or the P-frames. Such a conventional configuration tends to improve compression of, for example, visual information without significant loss in the display quality. Thus, if the received command requests that, for example, a particular P-frame or B-frame be decoded and displayed, then the following process may occur. In step 460, a first frame is retrieved from the data storage. In step 470, the first frame is decoded. For example, if a particular P-frame is requested to be decoded and displayed, the I-frame from which is derived the particular P-frame is retrieved using the index table and decoded. In step 480, a second frame is retrieved from the data storage. In step 490, the second frame is decoded using the first frame. In one example, the particular P-frame is retrieved and decoded using the I-frame. In step 500, the second frame is displayed. The first frame may or may not be displayed depending upon the received command. In another example, if the requested frame is a B-frame, then the respective I-frame and/or P-frame may be retrieved and decoded for use in decoding the particular B-frame. The retrieved frames used to decode, for example, the B-frame may or may not be displayed depending upon the received command. Furthermore, the present invention contemplates that the process may be applied to a wide variety of applications other than the decoding and displaying of P-frames and B-frames.

Figure 2:
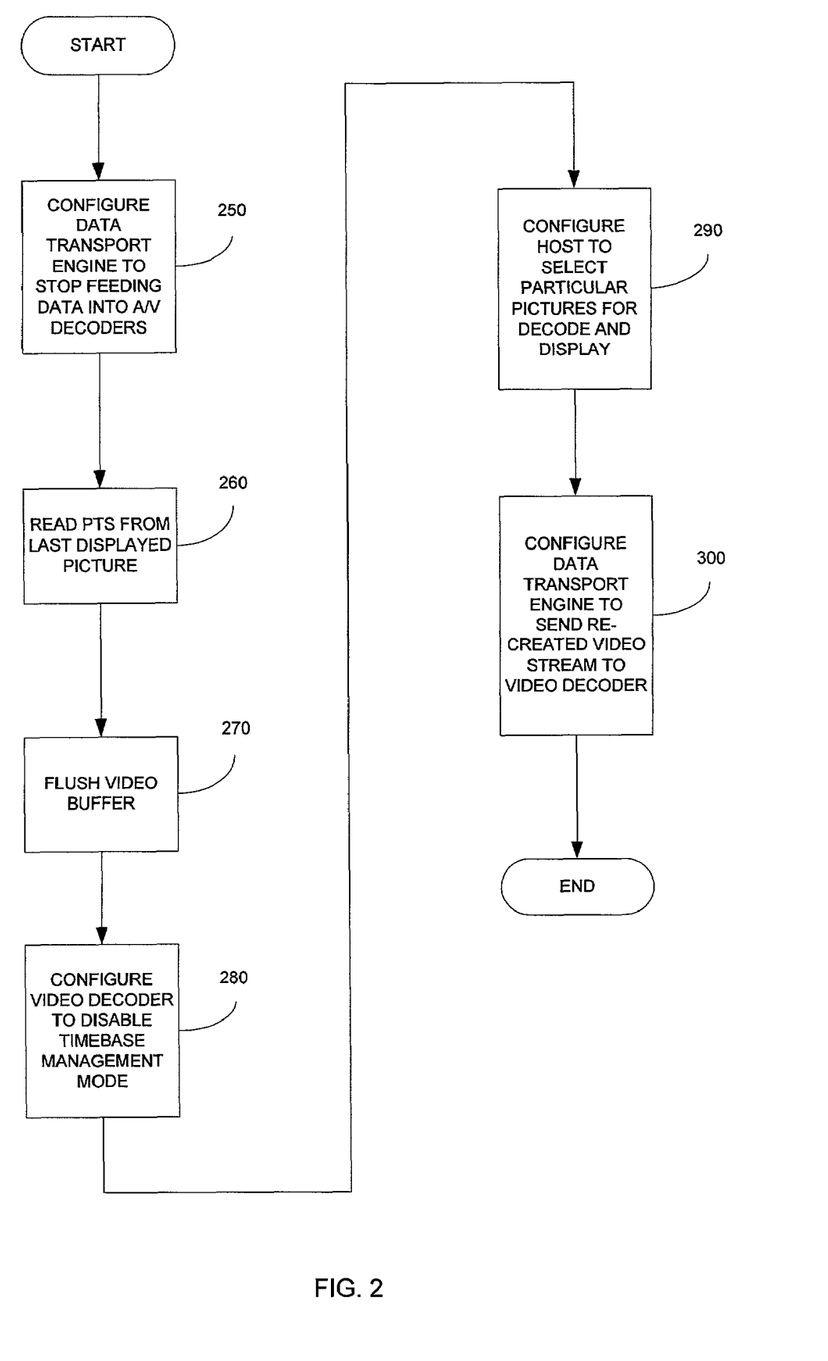
FIG. 2 is a flowchart illustrating an example of a process for entering a host trick mode according to the present invention.

FIG. 2 is a flowchart illustrating an example of a process for entering a host trick mode according to the present invention. In step 250, the data transport engine is configured to stop feeding data into the audio decoder and the video decoder. Thus, data is stopped from being fed into the playback channel. In step 260, the PTS is read from the last picture that the video decoder displayed. The present invention may also contemplate using the DTS instead of or in combination with the PTS. In one example, the DTS is used and the picture ordering is taken into account or considered. In step 270, the video buffer is flushed. In step 280, the video decoder is configured to operate with the timebase management mode disabled. In one example, the decode process begins with the video decoder configured to operate without timebase management since the timestamps in the stream may not be accurate during a host trick mode. In addition, the video decoder may be configured with the continuity counter verification disabled. If the video decoder is operating without timebase management, timebase discontinuities are not a substantial issue. However, if the timebase is being used to determine which particular picture to playback, then the host should monitor for timebase discontinuities.

In step 290, the host processor is configured to select particular pictures for playback. In one example, the host processor is configured to select particular pictures for decode and display as a function of, for example, the requested trick mode format, the PTS read from the video decoder and the contents of the index table of start codes. The host processor may use the PTS read from the video decoder as a guide as to where in the stream the playback should begin. The host processor may also employ the index table of start codes, which was created by the data transport engine during record, to determine where pictures are located in the buffer, which may be part of a memory (e.g., a unified SDRAM).

In step 300, the data transport engine is configured to send the recreated video stream to the video decoder. In one example, the data transport engine is configured to send the particular pictures selected by the host processor in a video stream to the video decoder. A playback engine may be configured to send pictures into the video decoder based on, for example, the type of trick mode selected.

Figure 3:
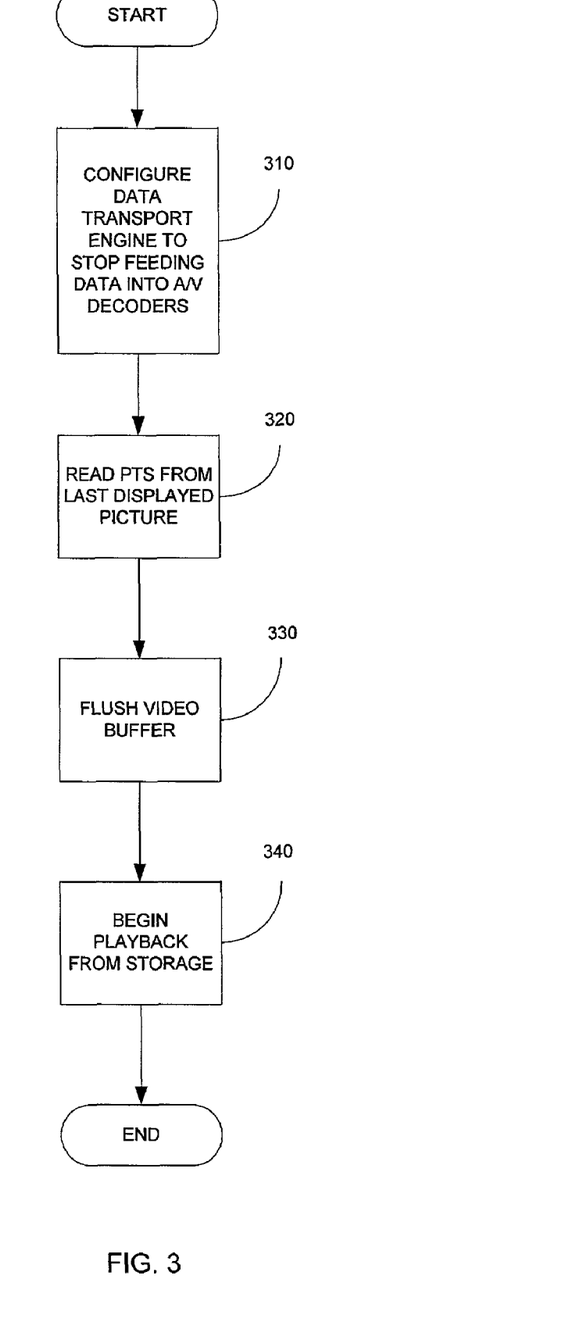
FIG. 3 is a flowchart illustrating an example of a process for exiting a host trick mode according to the present invention.

FIG. 3 is a flowchart illustrating an example of a process for exiting a host trick mode according to the present invention. In step 310, the data transport engine is configured to stop feeding data into the audio decoder and the video decoder. Thus, data is stopped from being fed into the playback channel. In step 320, the PTS is read from the last picture that the video decoder displayed. In step 330, the video buffer is flushed. In step 340, the playback from storage (e.g., disk) begins as described in more detail in the above-referenced applications that were incorporated by reference in their entirety. In one example, for seamless operation, playback may resume from the frame corresponding to the PTS that was returned from the video decoder. The continuity counter verification may also be enabled again.

Decode trick modes may be designed to implement trick mode functionality without the host directly manipulating the stream. In one example, to implement a particular decode trick mode, the decoder may be setup similarly as for a host trick mode, except that, for example, the continuity counters may remain enabled. The continuity counters may remain enabled since the stream is no longer being modified by the host.

Each of the decoder trick modes may take effect starting with the frame following the currently displayed frame. Leaving a decoder trick mode may also occur with the frame following the currently displayed frame. Once the stream is being decoded, the video decoder can be configured to support a wide variety of decode trick modes that may be implemented via, for example, the host. A few illustrative decode trick modes are listed below.

(1) Pause—The video decoder may be configured to stop decoding and to continue to display the last displayed picture.

(2) Frame advance—The video decoder may be configured to move one frame forward.

(3) Slow motion—The video decoder may be configured to display one frame every X vertical synchronization pulses, thus visually appearing in slow motion.

(4) Smooth fast forward—The video decoder may be configured to display Y frames every vertical synchronization pulse, thus visually appearing in smooth fast forward.

Figure 4:
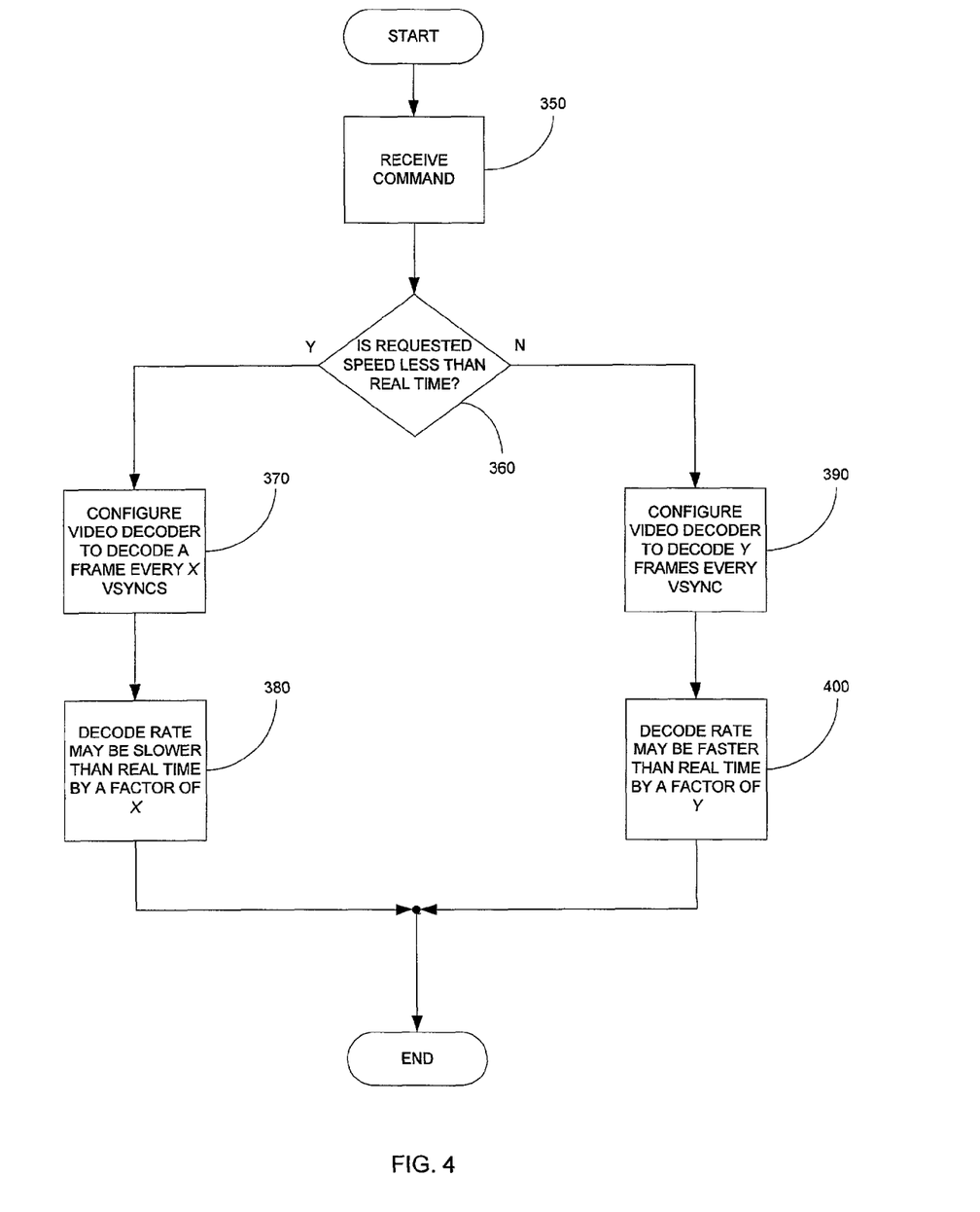
FIG. 4 is a flowchart illustrating an example of a process that provides a decode trick mode according to the present invention.

FIG. 4 is a flowchart illustrating an example of a process that provides a decode trick mode according to the present invention. In step 350, the video decoder receives a command indicating, for example, which decode trick mode to provide. This command may, for example, come from the host. In one example, the command may be command data contained, perhaps inserted, into a transport packet of the transport stream received by the video decoder. In query 360, the decoder determines whether the requested decode trick mode will display the frames at a rate that is slower than real time (e.g., a speed that is slower than normal-speed playback).

If the requested speed is less than real time, then the process jumps to step 370. In step 370, the video decoder is configured according to the command to decode a frame every X vertical synchronization pulses (vsyncs), where X is a positive number. In one example, the value of X may be determined from the received command. In another example, the value of X may be stored in the video decoder. The video decoder then decodes at a rate that may be slower than real time by a factor of X. Thus, in one example, the video decoder may generate 1/X-times slow motion. In fact, as the value of X increases, then the slow motion tends to become more and more like a pause.

If the requested speed is not less than real time, then the process jumps to step 390. In step 390, the video decoder is configured according to the command to decode Y frame every vsyncs, where Y is a positive number. In one example, the value of Y may be determined from the received command. In another example, the value of Y may be stored in the video decoder. In yet another example, X and Y may be the same variable. The video decoder then decodes at a rate that may be faster than real time by a factor of Y. Thus, for example, the video decoder may generate Y-times smooth fast forward.

For each of the above decoder trick modes, the video decoder may be programmed to display both fields or to display the top field only (e.g., repeat top field for both fields on the display). The programming of this mode may be active until the video decoder is programmed for another mode.

Thus, it is seen that systems and methods that provide personal video recording trick modes are provided. One skilled in the art will appreciate that the present invention can be practiced by other than the preferred embodiments which are presented in this description for purposes of illustration and not of limitation, and that the present invention is limited only by the claims that follow. It is noted that equivalents for the particular embodiments discussed in this description may practice the present invention as well.

What is claimed is:

1. A method for providing a trick mode in a personal video recording (PVR) system, the method comprising:
    in response to receiving a trick mode command:
        retrieving a first frame from a data storage;
        decoding the first frame;
        refraining from displaying the decoded first frame based at least in part on the trick mode command;
        retrieving a second frame from the data storage; and
        decoding the second frame using the first frame.

2. The method according to claim 1, further comprising displaying the second frame.

3. The method according to claim 1,
    wherein the first frame comprises an I-frame, and
    wherein the second frame comprises a P-frame.

4. The method according to claim 1, wherein the trick mode command comprises a command to decode the second frame.

5. The method according to claim 1, wherein the first frame comprises at least one of a third frame and a fourth frame.

6. The method according to claim 5,
    wherein the third frame comprises an I-frame,
    wherein the fourth frame comprises a P-frame, and
    wherein the second frame comprises a B-frame.

7. A method for entering a trick mode in a personal video recording (PVR) system, comprising:
    directing a data transport engine of the PVR system to halt feeding video data into a video decoder of the PVR system; and
    after the data transport engine halts feeding video data into the video decoder of the PVR system:
        directing the video decoder to read a time stamp from a last displayed picture;
        flushing a video buffer of the video decoder; and
        selecting particular pictures for display using an index table stored in the PVR system and the read time stamp.

8. The method according to claim 7, further comprising:
    directing the video decoder to operate with a timebase management mode disabled;
    generating a video stream from the selected pictures; and
    displaying the generated video stream with the timebase management mode disabled.

9. The method according to claim 7, further comprising:
    directing the video decoder to operate with a continuity counter disabled;
    generating a video stream from the selected pictures; and
    displaying the generated video stream with the continuity counter disabled.

10. A method for providing a trick mode in a personal video recording (PVR) system, comprising:
    receiving a trick mode command;
    determining a requested speed from the trick mode command;
    if the requested speed is less than real time speed, then configuring a video decoder to decode one frame for each X vertical synchronization pulses, where X is a positive number greater than one; and
    if the requested speed is not less than real time speed, then configuring the video decoder to decode Y frames for each vertical synchronization pulse, where Y is a positive number greater than one.

11. The method according to claim 10, wherein the trick mode is a decoder trick mode.

12. The method according to claim 10, wherein the video decoder provides approximately 1/X-times slow motion.

13. The method according to claim 10, wherein the video decoder provides approximately Y-times smooth fast forward.

14. The method according to claim 10, further comprising configuring the video decoder to decode without utilizing a timebase management mode.

15. The method according to claim 14, further comprising monitoring for timebase discontinuities with a host processor of the PVR system.

16. The method according to claim 10, further comprising inserting special transport packets containing configuration information for the video decoder.

17. The method of claim 10, further comprising displaying top fields only.

18. A personal video recording (PVR) system comprising at least one component operable to, at least:
    retrieve a first frame from a data storage in response to a received trick mode command;
    decode the retrieved first frame;
    refrain from displaying the decoded first frame based at least in part on the received trick mode command;
    retrieve a second frame from the data storage; and
    decode the second frame using the first frame.

19. A personal video recording (PVR) system comprising at least one component operable to, at least:
    direct a data transport engine of the PVR system to halt feeding video data into a video decoder of the PVR system; and
    after the data transport engine halts feeding video data into the video decoder of the PVR system:
        direct the video decoder to read a time stamp from a last displayed picture;
        flush a video buffer of the video decoder; and
        select particular pictures for display using an index table stored in the PVR system and the read time stamp.

20. A personal video recording (PVR) system comprising at least one component operable to, at least:
    receive a trick mode command;
    determine a requested speed from the trick mode command;
    if the requested speed is less than real time speed, then configure a video decoder to decode one frame for each X vertical synchronization pulses, where X is a positive number greater than one; and
    if the requested speed is not less than real time speed, then configure the video decoder to decode Y frames for each vertical synchronization pulse, where Y is a positive number greater than one.

* * * * *

UNITED STATES PATENT AND TRADEMARK OFFICE
CERTIFICATE OF CORRECTION

| | | |
|---|---|---|
| PATENT NO. | : 8,238,725 B2 | |
| APPLICATION NO. | : 10/174384 | |
| DATED | : August 7, 2012 | |
| INVENTOR(S) | : Jason Demas et al. | |

It is certified that error appears in the above-identified patent and that said Letters Patent is hereby corrected as shown below:

Title page, item (75) Inventors: line 6, after the word "(US)" delete the name "Vijayananand" and insert the name --Vijayanand--.

Signed and Sealed this
First Day of October, 2013

Teresa Stanek Rea
*Deputy Director of the United States Patent and Trademark Office*